US010893025B2

(12) United States Patent
Bykampadi et al.

(10) Patent No.: US 10,893,025 B2
(45) Date of Patent: Jan. 12, 2021

(54) SECURITY MANAGEMENT IN COMMUNICATION SYSTEMS WITH NETWORK FUNCTION ASSISTED MECHANISM TO SECURE INFORMATION ELEMENTS

(71) Applicant: Nokia Technologies Oy, Espoo (FI)

(72) Inventors: Nagendra S. Bykampadi, Bangalore (IN); Suresh P. Nair, Whippany, NJ (US); Anja Jerichow, Munich (DE)

(73) Assignee: Nokia Technologies Oy, Espoo (FI)

( * ) Notice: Subject to any disclaimer, the term of this patent is extended or adjusted under 35 U.S.C. 154(b) by 259 days.

(21) Appl. No.: 16/014,294

(22) Filed: Jun. 21, 2018

(65) Prior Publication Data
US 2019/0253395 A1    Aug. 15, 2019

(30) Foreign Application Priority Data
Feb. 15, 2018  (IN) .............................. 201841005885

(51) Int. Cl.
*H04L 29/06* (2006.01)
*H04W 12/06* (2009.01)
(Continued)

(52) U.S. Cl.
CPC .............. *H04L 63/04* (2013.01); *H04L 63/12* (2013.01); *H04L 63/20* (2013.01);
(Continued)

(58) Field of Classification Search
CPC ......... H04L 63/04; H04L 63/12; H04L 63/20; H04L 63/0471; H04L 67/02;
(Continued)

(56) References Cited

U.S. PATENT DOCUMENTS

| 6,728,536 B1 * | 4/2004 | Basilier | H04W 8/12 |
| | | | 455/432.1 |
| 7,213,143 B1 * | 5/2007 | Watson | H04L 63/0428 |
| | | | 713/151 |

(Continued)

FOREIGN PATENT DOCUMENTS

| EP | 1058429 A1 | 12/2000 |
| EP | 19157496 | 6/2019 |
| EP | 19157496 | 8/2020 |

OTHER PUBLICATIONS

3GPP, "3rd Generation Partnership Project; Technical Specification Group Services and System Aspects; System Architecture for the 5G System; Stage 2 (Release 15)," 3GPP TS 23.501, V15.0.0, Dec. 2017, 181 pages.

(Continued)

*Primary Examiner* — Ayoub Alata
(74) *Attorney, Agent, or Firm* — Ryan, Mason & Lewis, LLP (57) ABSTRACT

In a communication system comprising a first network operatively coupled to a second network, wherein the first network comprises a first security edge protection proxy element operatively coupled to a second security edge protection proxy element of the second network; the method comprises constructing a message at a network function in the first network destined for the second network, wherein the message comprises at least one information element and an indicator, wherein the indicator is set to specify at least one security operation to be applied to the at least one information element before sending the message to the second security edge protection proxy element of the second network.

20 Claims, 6 Drawing Sheets

(51) Int. Cl.
*H04W 12/08* (2009.01)
*H04W 88/16* (2009.01)
*H04W 12/00* (2009.01)
*H04L 29/08* (2006.01)
*H04W 84/04* (2009.01)
*H04W 12/10* (2009.01)

(52) U.S. Cl.
CPC ..... *H04W 12/00505* (2019.01); *H04W 12/06* (2013.01); *H04W 12/08* (2013.01); *H04W 88/16* (2013.01); *H04L 63/0471* (2013.01); *H04L 67/02* (2013.01); *H04W 12/001* (2019.01); *H04W 12/10* (2013.01); *H04W 84/042* (2013.01)

(58) Field of Classification Search
CPC ........... H04W 12/00505; H04W 12/06; H04W 12/08; H04W 88/16; H04W 12/001; H04W 12/10; H04W 84/042
See application file for complete search history.

(56) References Cited

U.S. PATENT DOCUMENTS

2017/0126638 A1* 5/2017 Ye ................. H04L 63/0471
2017/0331807 A1* 11/2017 Mont-Reynaud ........................ H04W 12/0802

OTHER PUBLICATIONS

3GPP, "3rd Generation Partnership Project; Technical Specification Group Services and System Aspects; Security Architecture and Procedures for 5G System (Release 15)," 3GPP TS 33.501, V0.7.0, Jan. 2018, 109 pages.
D. Hardt, Ed., "The OAuth 2.0 Authorization Framework," Internet Engineering Task Force (IETF) Request for Comments: 6749, https://tools.ietf.org/html/rfc6749, Oct. 2012, 77 pages.
M. Jones et al., "JSON Web Token (JWT)," Internet Engineering Task Force (IETF) Request for Comments: 7519, https://tools.ietf.org/html/rfc7519, May 2015, 31 pages.
M. Jones et al., "JSON Web Signature (JWS)," Internet Engineering Task Force (IETF) Request for Comments: 7515, https://tools.ietf.org/html/rfc7515, May 2015, 60 pages.
M. Jones et al., "JSON Web Encryption (JWE)," Internet Engineering Task Force (IETF) Request for Comments: 7516, https://tools.ietf.org/html/rfc7516, May 2015, 52 pages.
M. Jones et al., "The OAuth 2.0 Authorization Framework: Bearer Token Usage," Internet Engineering Task Force (IETF) Request for Comments: 6750, https://tools.ietf.org/html/rfc6750, Oct. 2012, 19 pages.
Nokia, "Considerations on Applying Security on HTTP Message Payload Discussion and Decision," 3GPP TSG SA WG3 (Security) Meeting #90, S3-180260, https://www.3gpp.org/ftp/tsg_sa/WG3_Security/TSGS3_90_Gothenburg/Docs/, Jan. 22-26, 2019, 5 pages.

* cited by examiner

SECURITY MANAGEMENT IN COMMUNICATION SYSTEMS WITH NETWORK FUNCTION ASSISTED MECHANISM TO SECURE INFORMATION ELEMENTS

FIELD

The field relates generally to communication systems, and more particularly, but not exclusively, to security management within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.0.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V0.7.0, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues can present a significant challenge.

SUMMARY

Illustrative embodiments provide improved techniques for security management in communication systems.

For example, in one illustrative embodiment, a method comprises the following step. In a communication system comprising a first network operatively coupled to a second network, wherein the first network comprises a first security edge protection proxy element operatively coupled to a second security edge protection proxy element of the second network; the method comprises constructing a message at a network function in the first network destined for the second network, wherein the message comprises at least one information element and an indicator, wherein the indicator is set to specify at least one security operation to be applied to the at least one information element before sending the message to the second security edge protection proxy element of the second network.

In another illustrative embodiment, a method comprises the following steps. In a communication system comprising a first network operatively coupled to a second network, wherein the first network comprises a first security edge protection proxy element operatively coupled to a second security edge protection proxy element of the second network; the method comprises receiving, at the first security edge protection proxy element, a message constructed at a network function in the first network destined for the second network, wherein the message comprises at least one information element and an indicator, wherein the indicator is set to specify at least one security operation to be applied to the at least one information element before sending the message to the second security edge protection proxy element of the second network; and applying, at the first security edge protection proxy element, the at least one security operation specified by the indicator to the at least one information element in the received message to form a secured message.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other conventional details that one of ordinary skill in the art will realize. However, while well-suited for 5G-related 3GPP standards, embodiments are not necessarily intended to be limited to any particular standards.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

Figure 1:
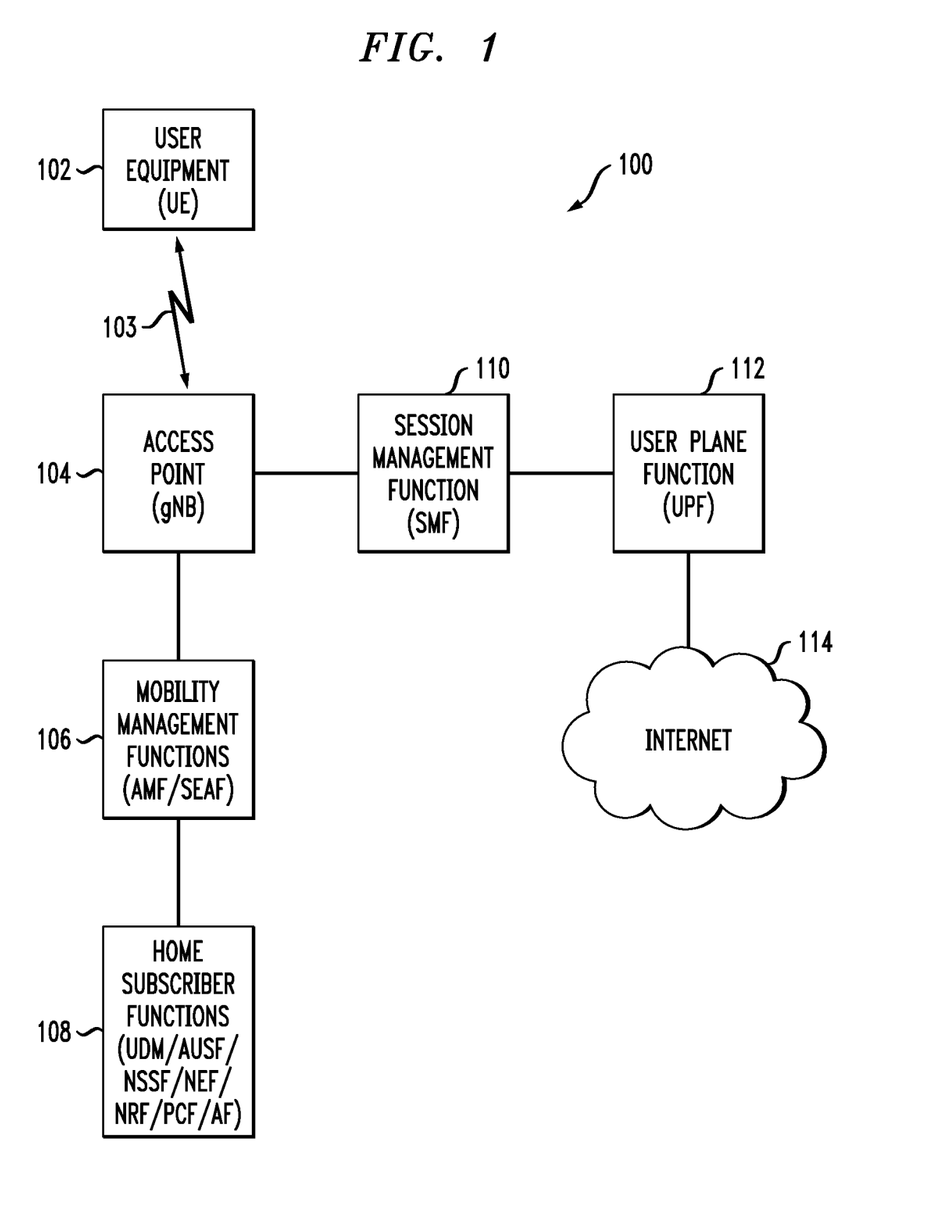
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI).

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity. In addition, home subscriber functions may include, but are not limited to, Network Slice Selection Function (NSSF), Network Exposure Function (NEF), Network Repository Function (NRF), Policy Control Function (PCF), and Application Function (AF).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation.

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
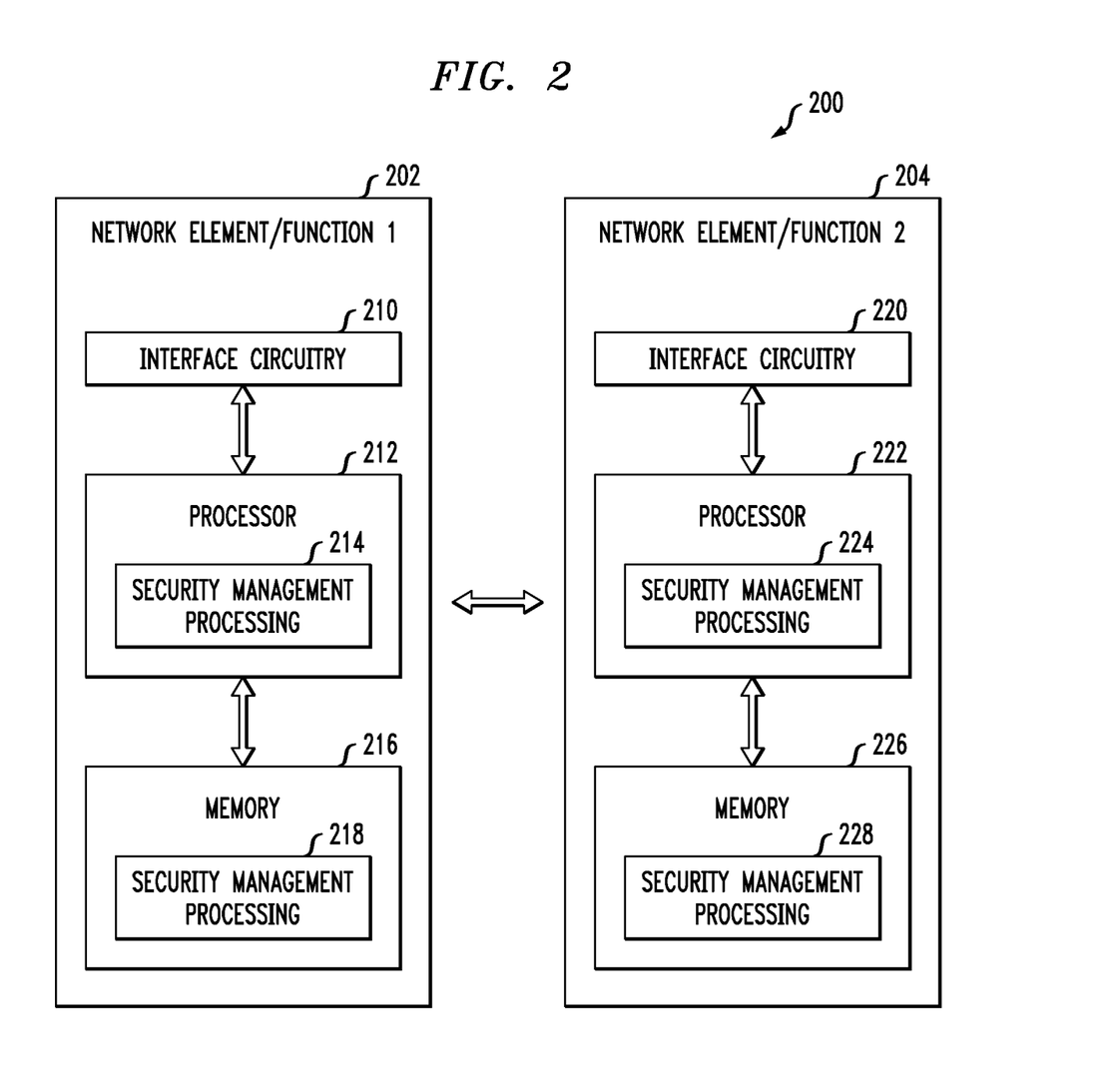
FIG. 2 illustrates network elements/functions for providing security management with which one or more illustrative embodiments may be implemented.

FIG. 2 is a block diagram of network elements/functions for providing security management in an illustrative embodiment. System 200 is shown comprising a first network element/function 202 and a second network element/function 204. It is to be appreciated that the network elements/functions 202 and 204 represent any network elements/functions that are configured to provide security management and other techniques described herein, for example, but not limited to, AMF, SEAF, UDM, AUSF, NSSF, NEF, NRF, PCF and AF. Further, one or both of the first network element/function 202 and the second network element/function 204 may be a Security Edge Protection Proxy (SEPP), which will be described in further detail below.

The network element/function 202 comprises a processor 212 coupled to a memory 216 and interface circuitry 210. The processor 212 of the network element/function 202 includes a security management processing module 214 that may be implemented at least in part in the form of software executed by the processor. The processing module 214 performs security management described in conjunction with subsequent figures and otherwise herein. The memory 216 of the network element/function 202 includes a security management storage module 218 that stores data generated or otherwise used during security management operations.

The network element/function 204 comprises a processor 222 coupled to a memory 226 and interface circuitry 220. The processor 222 of the network element/function 204 includes a security management processing module 224 that may be implemented at least in part in the form of software executed by the processor 222. The processing module 224 performs security management described in conjunction with subsequent figures and otherwise herein. The memory 226 of the network element/function 204 includes a security management storage module 228 that stores data generated or otherwise used during security management operations.

The processors 212 and 222 of the respective network elements/functions 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network elements/functions 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between the network elements/functions 202 and 204. The term "data" as used herein is intended to be construed broadly, so as to encompass any type of information that may be sent between network elements/functions (as well as between user equipment and a core network) including, but not limited to, messages, identifiers, keys, indicators, user data, control data, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

Given the general concepts described above, illustrative embodiments that address certain security management issues will now be described. More particularly, illustrative embodiments provide security management techniques for 5G systems. The architecture for 5G systems is currently being standardized in 3GPP. As mentioned above, the 3GPP TS 23.501 defines the 5G system architecture as service-based, e.g., Service-Based Architecture (SBA).

Figure 3:
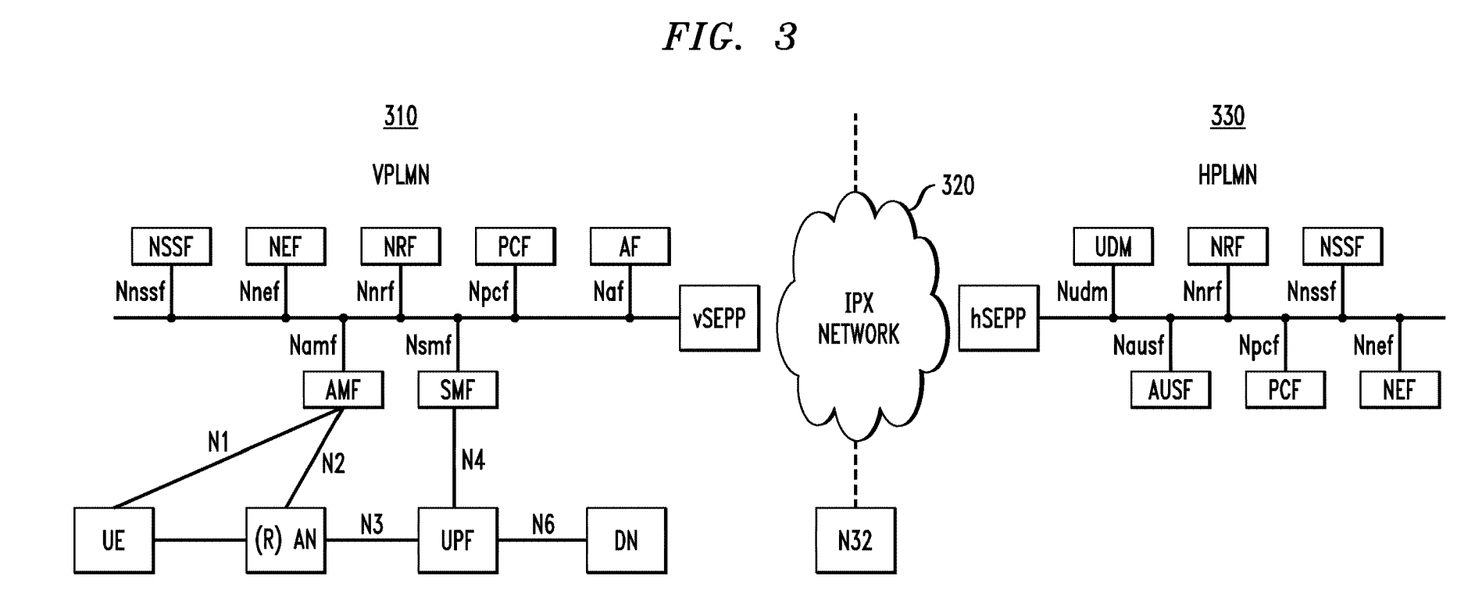
FIG. 3 illustrates a communication system architecture with security edge protection proxies between a visiting network and a home network with which one or more illustrative embodiments may be implemented.

FIG. 3 depicts a 5G architecture in a configuration comprising a visiting public land mobile network (VPLMN) 310 operatively coupled via an intermediate Internetwork Packet Exchange (IPX) network 320 to a home public land mobile network (HPLMN) 330. More particularly, FIG. 3 illustrates the presence of a Security Edge Protection Proxy (SEPP) at the edge of each PLM network (e.g., vSEPP in VPLMN 310 and hSEPP in HPLMN 330). It is to be appreciated that the various network functions shown in the VPLMN 310 and the HPLMN 330 are known and described in detail in various 5G specifications such as, but not limited to, the above-referenced TS 23.501 and TS 33.501.

Thus, the SEPP is the entity that resides at the perimeter of the network and performs Application Layer Security (ALS) on information elements (IE) in HyperText Transport Protocol (HTTP) messages before the messages are sent externally over a roaming interface (e.g., N32). ALS is performed individually on each IE in the HTTP Request message using a standardized JavaScript Object Signing and Encryption (JOSE) framework.

However, each IE may require different security protection, for example, only some of the IEs in the message need encryption, some will need integrity-protection while being allowed to be modified by a node in IPX network 320. Therefore, it is realized herein that since IE may require different security protection, it is important for the SEPP to know how to treat each IE in the message received from the network function.

Identification of the IE and the required security mechanism to be applied on the IE is therefore a prerequisite step for the SEPP before it can apply security at the application layer.

As mentioned above, in 5G, SBA is introduced to model services as network functions (NFs) that communicate with each other using Restful APIs. In the scenario where the two communicating NFs are in two different PLMNs (e.g., VPLMN 310 and HPLMN 330), communication happens over the roaming interface between the two participating PLMNs.

To protect NF specific content in the messages that are sent over the roaming interface, 5G introduces SEPP as the entity residing at the perimeter of the PLMN network and acting as a gateway that protects all the traffic going out of the network. The SEPP implements application layer traffic for all the data exchanged between two NFs at the service layer.

The application layer traffic comprises all the IEs in the HTTP message payload and sensitive information in the HTTP message header. Not all the IEs get the same security treatment in SEPP. Some IEs require e2e encryption, some only require e2e integrity protection, while some IEs require e2e integrity protection but allows an intermediate IPX provider to manipulate these IEs. For example, some of the IEs include a permanent subscription identity (SUPI) of the UE or encrypted SUPI (SUCI), an IP address of the UE, an IP address of the NFs or their identifiers within a PLMN, Authentication Vectors (AVs) for the UE, subscription parameters of the UE, network slice subscription/eligibility parameters, location information of the UE, charging information or call data records, etc. Some of these IEs would need e2e encryption, while some need e2e integrity protection, and some others need both integrity and encryption.

The SEPP therefore needs a mechanism to identify IEs and the type of security mechanisms that need to be applied on them.

Illustrative embodiments address the above and other needs and challenges by providing per-IE indicators in Network Function (NF) Restful APIs to assist the SEPP in:
a) identifying IEs in the received HTTP message; and
b) implementing the required security protection for them.

The per-IE indicators are set by NFs while constructing these messages when the HTTP message is sent to the SEPP. The SEPP uses these indicators to appropriately protect the IEs in the received message before the message is sent externally on the N32 interface.

In one or more illustrative embodiments, ALS is a two-step process executed by two entities:
a) NFs uses the indicator to inform SEPP on how the IE must be handled; and
b) SEPP uses the indicator to apply the necessary security treatment.

Applying Security on an Outgoing Message:
Within the PLMN, the SEPP interfaces with the NFs over an HTTP based interface. On the outbound side, it interfaces with the other SEPPs over the N32 interface.

NFs are aware of how IEs need to be secured (e.g., integrity-only or confidentiality-protection, etc.). Thus, an NF sets the indicator value in each of the IEs in the message as it constructs the HTTP Request message to be sent over the roaming interface. SEPP uses this indicator to accurately protect the IE using JOSE framework.

When SEPP receives a message from the NF, the SEPP (e.g., either vSEPP or hSEPP depending on the direction flow of the message) does the following:
a. It parses the HTTP message payload beginning from the first IE.
b. For each IE in the message, the SEPP refers to the enabled indicator element and executes the required protection mechanism using standardized JOSE framework. The transformed IE replaces the original IE.
c. Once the SEPP parses the message completely, it transmits the secure message over the N32 interface.

Restoring Original Message from the Incoming Message:
When SEPP (e.g., either vSEPP or hSEPP depending on the direction flow of the message) receives an incoming message on the N32 interface:

a. SEPP parses the HTTP message payload beginning from the first IE.
b. For each IE in the message, the SEPP transforms the secure message into the original message from the information contained in the JOSE object.
c. Once SEPP parses the message completely, it forwards the message to the destination NF.

Figure 4:
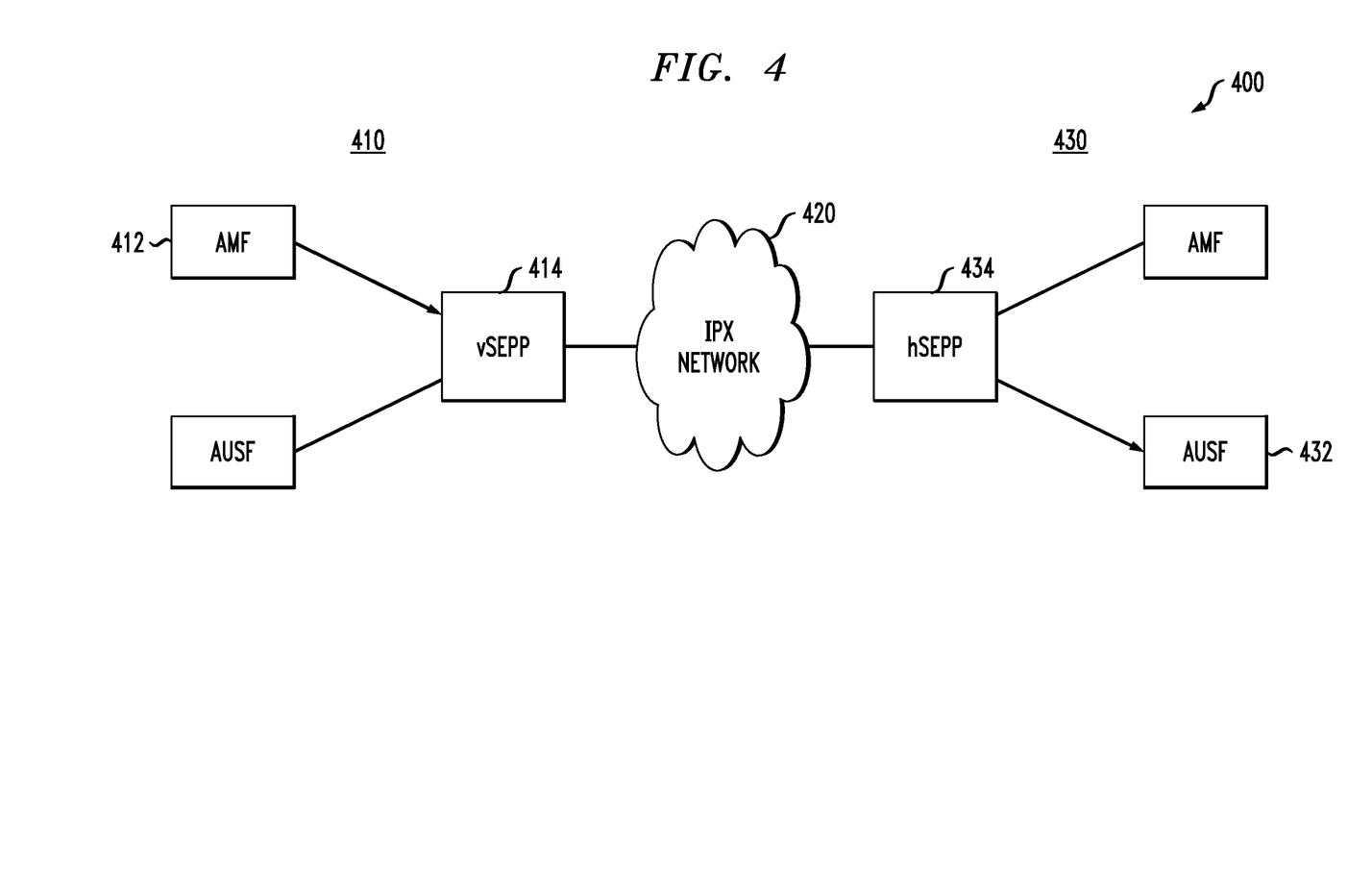
FIG. 4 illustrates an example of a message passing from a network function in a visiting network to a network function in a home network via security edge protection proxies with which one or more illustrative embodiments may be implemented.

In FIG. 4, example 400 depicts a VPLMN 410 operatively coupled via an IPX network 420 to an HPLMN 430. AMF NF 412 in VPLMN 410 invokes an API request on the AUSF NF 432 in HPLMN 430. The message flow is as follows:
a. The AMF NF 412 first sends the HTTP Request message to its local SEPP (i.e., vSEPP 414).
b. The vSEPP 414 applies ALS and sends the secure message on the N32 interface to AUSF NFs 432 in HPLMN 430.
c. The hSEPP 434 is at the edge of the HPLMN 430 and receives all incoming HTTP messages from its roaming partners.
d. The hSEPP 434 removes the security mechanism applied at the application layer and forwards the resulting HTTP message to the corresponding AUSF NF 432.

Figure 5:
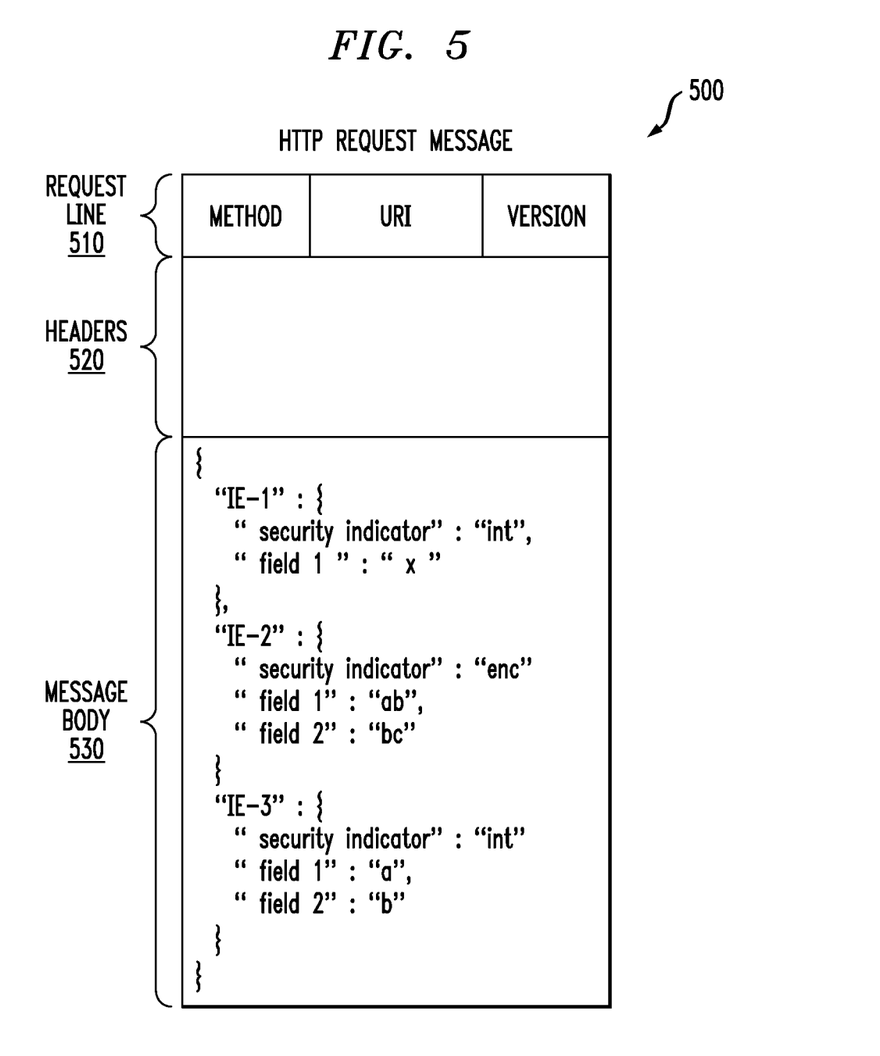
FIG. 5 illustrates an example of a message request with network function security indicators in information elements of the message body, according to an illustrative embodiment.

In accordance with an illustrative embodiment, FIG. 5 shows an example 500 of a proposed HTTP Request message format which includes a separate security indicator value in every JavaScript Object Notation (JSON)-based IE in the HTTP message body. The format 500 comprises a request line 510, headers 520, and message body 530. Note that there are three IEs shown in this exemplary message body 530 (IE-1, IE-2, and IE-3), and therefore three security indicators including "enc" indicating encryption and "int" indicating integrity-protection. The per-IE based security indicator (e.g., flag in one illustrative embodiment) is to indicate how each IE must be protected (e.g., "enc" or "int") by its local SEPP before the HTTP message is sent on the N32 interface.

Figure 6:
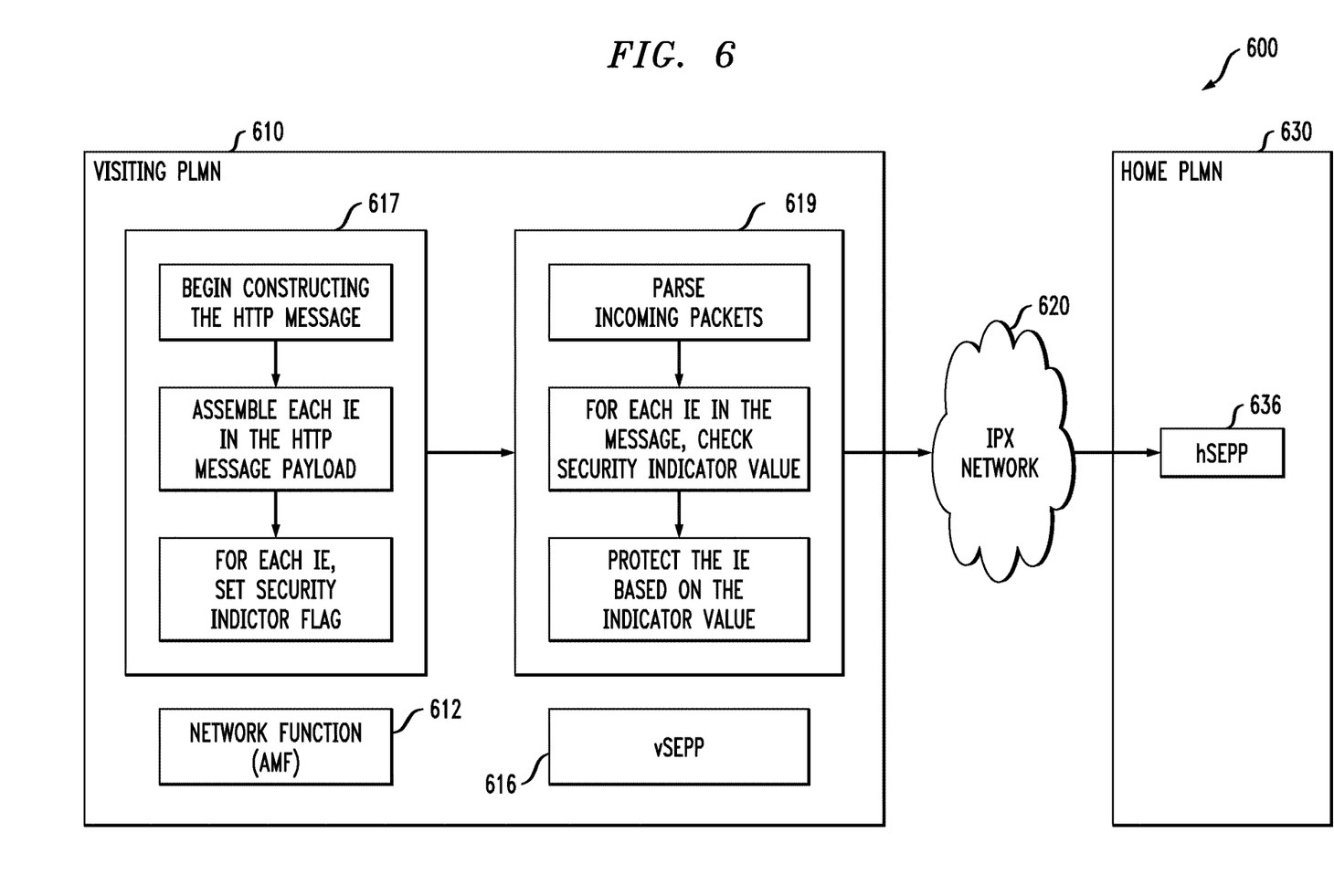
FIG. 6 illustrates a security management process of a security edge proxy applying application layer security on an outgoing message based on network function security indicators, according to an illustrative embodiment.

FIG. 6 illustrates an illustrative embodiment of a security management process 600 within a VPLMN 610 operatively coupled via an IPX network 620 to an HPLMN 630. More particularly, FIG. 6 depicts how the sending NF (AMF 612, in this example) and the local SEPP (vSEPP 616) work in tandem to protect each IE in the HTTP Message, before it is sent on the N32 interface to the neighbouring SEPP (hSEPP 636).

Network functions being the source of the message are aware of how the IEs need to be secured (integrity-only or confidentiality-protection, etc.). These IEs are 3GPP specific IEs defined in 3GPP working groups and they contain identities and parameters meaningful to other (3GPP) NFs. Hence, what to protect and how to protect (e.g., integrity, encryption, or both) is assumed to be known at the sending NF. Thus, in illustrative embodiments, each JSON-based IE has an additional field to indicate how to protect the IE. The NF sets the indicator value in each of the JSON IEs in the message as it constructs the HTTP Request message to be sent over the roaming interface (617 in FIG. 6).

When NF invokes an API on the NF in the roaming partner network, the sending NF sends the message to its local SEPP (i.e. vSEPP 616).

When vSEPP 616 receives a message from the NF, it does the following (619 in FIG. 6):
a. vSEPP 616 parses the HTTP message payload beginning from the first IE.
b. For each IE in the message, vSEPP 616 refers to the enabled indicator value and executes the required protection mechanism using the standardized JOSE framework.
c. The transformed IE replaces the original IE.
d. Once it parses the message completely, the vSEPP 616 transmits the secure message over the N32 interface to the neighbouring SEPP (hSEPP 636) via the IPX network 620.

Application layer security is thus achieved based end-to-end security management between two SEPPs of the roaming partners based on the indicators set by the sending network function.

It should therefore again be emphasized that the various embodiments described herein are presented by way of illustrative example only, and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

What is claimed is:
1. A method comprising:
in a communication system comprising a first network operatively coupled to a second network, wherein the first network comprises a first security edge protection proxy element operatively coupled to a second security edge protection proxy element of the second network, wherein the first network comprises a visited network in the communication system and the second network comprises a home network in the communication system;
constructing a message at a first network function in the first network destined for a second network function in the second network, wherein the message comprises at least one information element and at least one indicator, wherein the at least one indicator is set to specify at least one security operation to be applied to the at least one information element before sending the message to the second security edge protection proxy element of the second network.
2. The method of claim 1, further comprising the first network function in the first network sending the constructed message to the first security edge protection proxy element such that the first security edge protection proxy element can apply the at least one security operation specified by the at least one indicator set by the first network function in the message.
3. The method of claim 1, wherein the at least one security operation comprises one or more of encryption, integrity-protection, confidentiality-protection, and information element modification control.
4. The method of claim 1, wherein the constructed message further comprises at least one additional information element and at least one additional indicator set to specify at least one additional security operation to be applied to the at least one additional information element before sending the message to the second security edge protection proxy element of the second network.
5. The method of claim 4, wherein the at least one security operation specified by the at least one indicator for the at least one information element and the at least one additional security operation specified by the additional indicator for the at least one additional information element in the constructed message are different security operations.

6. The method of claim 1, wherein the constructed message is a HyperText Transport Protocol (HTTP) request message.

7. The method of claim 6, wherein a format of the HTTP request message utilizes a JavaScript Object Notation (JSON).

8. The method of claim 1, wherein the communication system comprises a 5G system.

9. An article of manufacture comprising a non-transitory computer-readable storage medium having embodied therein executable program code that when executed by a processor causes the processor:
  in a communication system comprising a first network operatively coupled to a second network, wherein the first network comprises a first security edge protection proxy element operatively coupled to a second security edge protection proxy element of the second network, wherein the first network comprises a visited network in the communication system and the second network comprises a home network in the communication system;
  to construct a message at a first network function in the first network destined for a second network function in the second network, wherein the message comprises at least one information element and at least one indicator, wherein the at least one indicator is set to specify at least one security operation to be applied to the at least one information element before sending the message to the second security edge protection proxy element of the second network.

10. Apparatus comprising:
  in a communication system comprising a first network operatively coupled to a second network, wherein the first network comprises a first security edge protection proxy element operatively coupled to a second security edge protection proxy element of the second network, wherein the first network comprises a visited network in the communication system and the second network comprises a home network in the communication system;
  at least one processor coupled to a memory and configured to:
  construct a message at a first network function in the first network destined for a second network function in the second network, wherein the message comprises at least one information element and at least one indicator, wherein the at least one indicator is set to specify at least one security operation to be applied to the at least one information element before sending the message to the second security edge protection proxy element of the second network.

11. A method comprising:
  in a communication system comprising a first network operatively coupled to a second network, wherein the first network comprises a first security edge protection proxy element operatively coupled to a second security edge protection proxy element of the second network, wherein the first network comprises a visited network in the communication system and the second network comprises a home network in the communication system;
  receiving, at the first security edge protection proxy element, a message constructed at a first network function in the first network destined for a second network function in the second network, wherein the message comprises at least one information element and at least one indicator, wherein the at least one indicator is set to specify at least one security operation to be applied to the at least one information element before sending the message to the second security edge protection proxy element of the second network; and
  applying, at the first security edge protection proxy element, the at least one security operation specified by the at least one indicator to the at least one information element in the received message to form a secured message.

12. The method of claim 11, wherein the first security edge protection proxy element parses the received message to obtain the at least one information element.

13. The method of claim 11, further comprising the first security edge protection proxy element sending the secured message to the second security edge protection proxy element of the second network.

14. The method of claim 11, wherein the received message further comprises at least one additional information element and at least one additional indicator set to specify at least one additional security operation to be applied to the at least one additional information element before sending the message to the second security edge protection proxy element of the second network.

15. The method of claim 14, wherein the at least one security operation specified by the at least one indicator for the at least one information element and the at least one additional security operation specified by the additional indicator for the at least one additional information element in the constructed message are different security operations.

16. The method of claim 11, wherein the received message is a HyperText Transport Protocol (HTTP) request message.

17. The method of claim 16, wherein a format of the HTTP request message utilizes a JavaScript Object Notation (JSON).

18. An article of manufacture comprising a non-transitory computer-readable storage medium having embodied therein executable program code that when executed by a processor causes the processor:
  in a communication system comprising a first network operatively coupled to a second network, wherein the first network comprises a first security edge protection proxy element operatively coupled to a second security edge protection proxy element of the second network, wherein the first network comprises a visited network in the communication system and the second network comprises a home network in the communication system;
  to receive, at the first security edge protection proxy element, a message constructed at a first network function in the first network destined for a second network function in the second network, wherein the message comprises at least one information element and at least one indicator, wherein the at least one indicator is set to specify at least one security operation to be applied to the at least one information element before sending the message to the second security edge protection proxy element of the second network; and
  to apply, at the first security edge protection proxy element, the at least one security operation specified by the at least one indicator to the at least one information element in the received message to form a secured message.

19. Apparatus comprising:
  in a communication system comprising a first network operatively coupled to a second network, wherein the first network comprises a first security edge protection proxy element operatively coupled to a second security edge protection proxy element of the second network, wherein the first network comprises a visited network in the communication system and the second network comprises a home network in the communication system;

at least one processor coupled to a memory and configured:

to receive, at the first security edge protection proxy element, a message constructed at a first network function in the first network destined for a second network function in the second network, wherein the message comprises at least one information element and at least one indicator, wherein the at least one indicator is set to specify at least one security operation to be applied to the at least one information element before sending the message to the second security edge protection proxy element of the second network; and to apply, at the first security edge protection proxy element, the at least one security operation specified by the at least one indicator to the at least one information element in the received message to form a secured message.

20. The method of claim 1, wherein the constructed message comprises a hypertext transfer protocol (HTTP) request message comprising a request line, one or more headers, and a message body, the HTTP request message comprising a separate indicator value for each JavaScript Object Notation (JSON)-based information element in the message body.

* * * * *